United States Patent
Krauss et al.

(10) Patent No.: US 9,621,350 B2
(45) Date of Patent: Apr. 11, 2017

(54) PERSONAL AUTHENTICATION

(75) Inventors: Simon L. Krauss, Denver, CO (US);
Oscar G. Marcia, Broomfield, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 1013 days.

(21) Appl. No.: 13/173,306

(22) Filed: Jun. 30, 2011

(65) Prior Publication Data
US 2013/0006784 A1 Jan. 3, 2013

(51) Int. Cl.
| | |
|---|---|
| G06Q 20/20 | (2012.01) |
| G06Q 20/40 | (2012.01) |
| G06Q 30/06 | (2012.01) |
| H04L 9/32 | (2006.01) |
| G06Q 20/38 | (2012.01) |

(52) U.S. Cl.
CPC ......... *H04L 9/3231* (2013.01); *G06Q 20/206* (2013.01); *G06Q 20/388* (2013.01); *G06Q 20/40145* (2013.01); *H04L 2209/56* (2013.01)

(58) Field of Classification Search
CPC combination set(s) only.
See application file for complete search history.

(56) References Cited

U.S. PATENT DOCUMENTS

| | | | |
|---|---|---|---|
| 7,404,086 B2* | 7/2008 | Sands et al. | 713/186 |
| 7,690,032 B1* | 3/2010 | Peirce | 726/9 |
| 8,189,878 B2* | 5/2012 | Schultz | 382/115 |
| 2003/0046237 A1* | 3/2003 | Uberti | 705/44 |
| 2005/0125296 A1* | 6/2005 | Tidwell et al. | 705/16 |
| 2007/0094509 A1* | 4/2007 | Wei et al. | 713/176 |
| 2007/0136792 A1* | 6/2007 | Ting et al. | 726/5 |
| 2007/0250451 A1* | 10/2007 | Lee et al. | 705/65 |
| 2008/0222711 A1* | 9/2008 | Michaelis | 726/7 |
| 2010/0332308 A1* | 12/2010 | Yap et al. | 705/14.34 |
| 2012/0253953 A1* | 10/2012 | Aziz et al. | 705/16 |

* cited by examiner

*Primary Examiner* — Luna Champagne
(74) *Attorney, Agent, or Firm* — Great Lakes Intellectual Property, PLLC

(57) ABSTRACT

A method and system of authenticating a person is disclosed. The authentication may include verifying authenticity of the person when interacting with a point of sale system or other authenticating requesting device according to whether biometric information collected proximate in time to the authentication request sufficiently correlates with biometric information previously collected from trust sources.

17 Claims, 2 Drawing Sheets

PERSONAL AUTHENTICATION

TECHNICAL FIELD

The present invention relates to personal authentication, such as but not limited to personal authentication based on biometric information.

BACKGROUND

Some systems include methods for persons to purchase products, enter secure areas, and to be granted other privileges if an authenticity of the person can be confirmed. These systems may provide the person with a credit card, security badge, or other physical device to authenticate the person when presented at a corresponding kiosk, point of sale system, security control point, etc. The use of physical devices can be problematic since the devices are not biometrically tied to the person and can easily be used by others if lost or stolen. Accordingly, the present invention contemplates facilitating personal authentication based on biometric information that is less likely to be used by others if lost or stolen.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
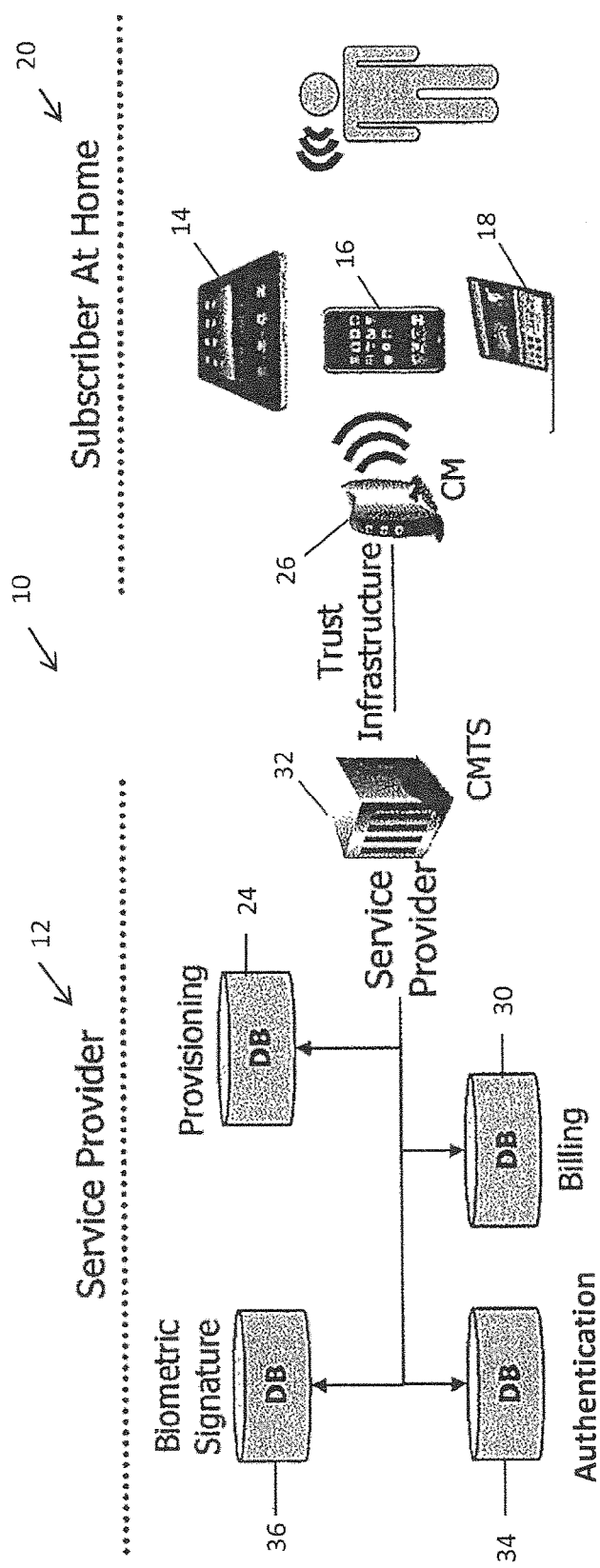
FIG. 1 illustrates a biometric authentication system as contemplated by one non-limiting aspect of the present invention.

FIG. 1 illustrates a biometric authentication system 10 as contemplated by one non-limiting aspect of the present invention. The system 10 is described for exemplary purposes with respect to a service provider 12 operable to provide services to one or more devices 14, 16, 18 included within a home of a corresponding subscriber. The service provider 12 may be a satellite, broadcast, and cable television service provider; high speed data service provider; telephony service provider (wireline, wireless, VoIP, cellular), and the like. While the service provider 12 is predominately described with respect to providing media services to a home 20, the present invention fully contemplates its application in other suitable environments. The service provider 12, likewise, may be any type of entity or system capable of adjudicating the trustworthiness of biometric information collected in accordance with the present invention.

The service provider 12 may include a provisioning device 24 operable to provision a gateway or other access point 26 in the home 20 and/or the user devices 14, 16, 18 in communication therewith. The provisioning device 24 may be configured to provision the gateway 26 and/or user devices 14, 16, 18 to facilitate television program related transmissions, cellular/VoIP phone related communications, video on demand (VOD), Internet access (web browsing), enhanced television (ETV), interactive television (iTV), whole home networking (e.g., messaging based control/monitoring of in-home appliances), home security, etc. The provisioning device 24 may also transmit an authentication application to the home-based devices 14, 16, 18 such that the application controls or facilitates control of the devices 14, 16, 18 to capture biometric information in a manner contemplated by the present invention to facilitate biometric-based identification.

The devices 14, 16, 18 shown may correspond with any type of electronic device capable of being operated in response to biometrically based commands and/or any type of electronic device capable of capturing biometric information. One type of device, such as but not limited to the illustrated tablet PC 14, mobile computer 18, and cellular phone 16, may be considered as media devices since they can interface media signaling of the service provider 12 with a user. The devices 14, 16, 18 may include voice recognition type applications or capabilities that permit verbal command controls. These types of devices 14, 16, 18 may be configured to record voice samples while being verbally commanded so that the voice samples can be used in generating biometric information on the corresponding user. Home appliances, gaming consoles, security cameras, settop boxes (STB) etc., while not specifically shown, may also be located within the home 20 and operated in accordance with the present invention to capture other biometric information, such as a video, static images, and fingerprints. The devices 14, 16, 18 having capabilities to collect biometric information may be configured to communication the collected information to the service provider 12, such as according to parameters specified by the authentication application.

The service provider 12 may include a billing device 30 operable to track billing information for a primary subscriber associated with the home 20 and/or individually for each user of the user devices 14, 16, 18. The billing device 30 may include a table for relating the devices 14, 16, 18 to a subscriber at the home responsible for bill payment and/or accounts of the individual users of the user devices. The billing information may be generated as part of an enrollment process conducted prior to provisioning the gateway 26 and/or user devices 14, 16, 18 to access the service provider services. Once the gateway 26 and user devices 14, 16, 18 are sufficiently provisioned, the billing device 30 may update the table to include the particulars of the provisioning information used to provision the gateway 26 and/or user devices 14, 16, 18, e.g., MAC address, IP addresses, location (from billing information), and number of user (accounts purchased).

The ability to cross-reference the provisioning information with the billing information allows the present invention to ascertain a certain level of trust with the gateway 26 and user devices 14, 16, 18, at least with respect to the assumption that a thief is unlikely to complete the enroll process necessary to gain access to the service provider's services. One non-limiting aspect of the present invention contemplates relying on this presumed level of trust that the user consuming services of the service provider 12 is actually one of the users identified to the billing device 30. This trust can then be extended to the biometric information collected from the user devices 14, 16, 18 such that collected biometric information may be associated with the known and trusted users.

In this manner, the gateway 26 may act as a point of reference when assessing whether to trust biometric information provided from the user devices 14, 16, 18. The gateway 26, or other access point, may be evaluated to determine if it is trusted or untrusted. A trusted gateway 26 may be one having operating parameters matching provisioning information provided from the provisioning device 24 to the billing device 30. For example, if a gateway 26 or the user device 14, 16, 18 attempts to provide biometric information, the corresponding MAC address and/or IP address may be assessed to determine if it is trusted. FIG. 1 shows once such arrangement where a Cable Modem Termination System (CMTS) supports communicating at the home 20 through a cable modem 26. Of course, a similar arrangement can be provided between a headend unit and an STB, a cellular tower and receiver, etc.

The source 14, 16, 18, 26 may be considered as trusted, for example, if it is identified to be within a domain of MAC addresses or IP address subnets specified within the provisioning information already stored at the billing device 30 as being associated within one or more active subscribers. The use of such addressing verification techniques can be susceptible to cloning or spoofing. As such, the present invention contemplates implementing address protection processes.

In the event the gateway 26 is a DOCSIS cable modem (access point), its address spoofing or cloning may be prevented by the following: MAC address domain validation wherein the cable modem provisioning system 24 only allows a cable modem 26 to operate in an authorized (CMTS) MAC address domain such that if a hacker tries to clone the MAC address and use it in a different MAC address domain the provisioning system 24 will block it (note: The CMTS 32 can be configured to block duplicate MAC address in the same domain). IP Address spoofing of the user devices 14, 16, 18 can be prevented by the following: a router configuration (device connected cable modem/access point 26) may be required to prevent traffic unless it is associated with a source IP address within the service provider's client subnet; and source address verification where client applications on the service provider's network can only use IP addresses assigned by the service provider's provisioning system (DOCSIS 3.0 provides this feature).

While a cloned gateway (untrusted) and a non-cloned gateway (trusted) cannot simultaneously operate effectively on the same node, they can operate effectively on the same node when the other is inactive. As such, simply relying on a match of the MAC address and/or domain name may not be a sufficient representation of the trustworthiness of the gateway. An additional factor of trustworthiness may be whether the service provider 12 is able to support SNMP communications with the gateway 26. The ability to support SNMP communication means the service provider is able to 'ping' the gateway through known, and trusted, addressing techniques, i.e., it may be unlikely of an SNMP 'ping' issued to a non-cloned gateway to reach a cloned gateway. Another additional factor of trustworthiness may be whether the gateway 26 is actively supporting Baseline Privacy Interface Plus (BPI+) or some other certification based privacy system by which the service provider would assign a certificate to each gateway that would be difficult for a cloned device to copy.

The service provider 12 may include a biometric authentication device 24. The biometric authentication device 34 may be configured to generate biometric signatures of the users interacting with the user devices 14, 16, 18, such as by processing the voice, video, image, and other biometric information collected by the user devices 14, 16, 18. The biometric authentication device may collect the biometric information and categorize it according to the associated user in order to assembly a library of biometric signatures 36. A log-on operation, verbal recordation, or some other identification process (MAC/IP address of the originating device relative to an associated user) may be needed to at least initially identify the users to be assigned to each biometric signature. As more signatures are collected, the information may be automatically assigned to the user, or when possible, other identifying information may be used to assure an accurate association with the proper user.

The information of the billing device 30 may be useful in correlating the provisioning information to an identifiable one of the users and their biometric signatures. The user may be identified as the one of the plurality of users noted in the billing device 30 has an authorized user of the corresponding gateway/user device 14, 16, 18, 26. Optionally, the biometric authentication device 34 may generate an initial biometric signature at the time of enrollment or when new users are added so that each user can be accurately associated with trusted biometric signatures. The biometric authentication device 34 may be configured to improve its signature recognition capabilities, i.e., its ability the correlate new signatures with existing signatures, as more trusted signatures are collected. In this manner, the biometric authentication device 34 may continually enhance the accuracy of the biometric signature library for each user.

In the event a particular biometric signature cannot be accurately associated with an individual user, it may be associated with the gateway 26, and thereby, the primary subscriber responsible services accessed through the gateway 26. This process may be used to generate biometric signatures that are non-user specific but specific to the home, business, or other entity 20 having the trusted gateway 26. As described below in more detail, if correlation a biometric authentication request to a specific user is not possible, the biometric signature library may still be used to execute the biometric authentic request to a particular gateway 26. Of course, there are some risks in enabling this broader authentication and it may be beneficial to implement a security measure to limit the scope of privileges permitted for such non-user specific authentication, at least in comparison to a corresponding user specific authentication.

The present invention contemplates the service provider 12 determining the biometric signatures and using those signatures to biometrically authenticate users having known signatures when those users are at locations away from the gateway 26 through which their biometric information was collected, e.g., at untrusted locations or locations where the user biometric signature has not been assessed sufficiently over time to gain a desired level of trust. This can be helpful in allowing the service provider 12 to authenticate their subscriber when the subscribers are located outside the home 20, such as when attempting to make a purchase at a point of sale system (e.g., cash register, ATM machine, kiosk, web-site, etc.) or when attempting to gain access to a secured area (locked/secure building, bank, etc.). The biometric authentication device may include suitable interfaces and communications means to facilitate signaling with non-service provider entities requesting biometric authentications.

Figure 2:
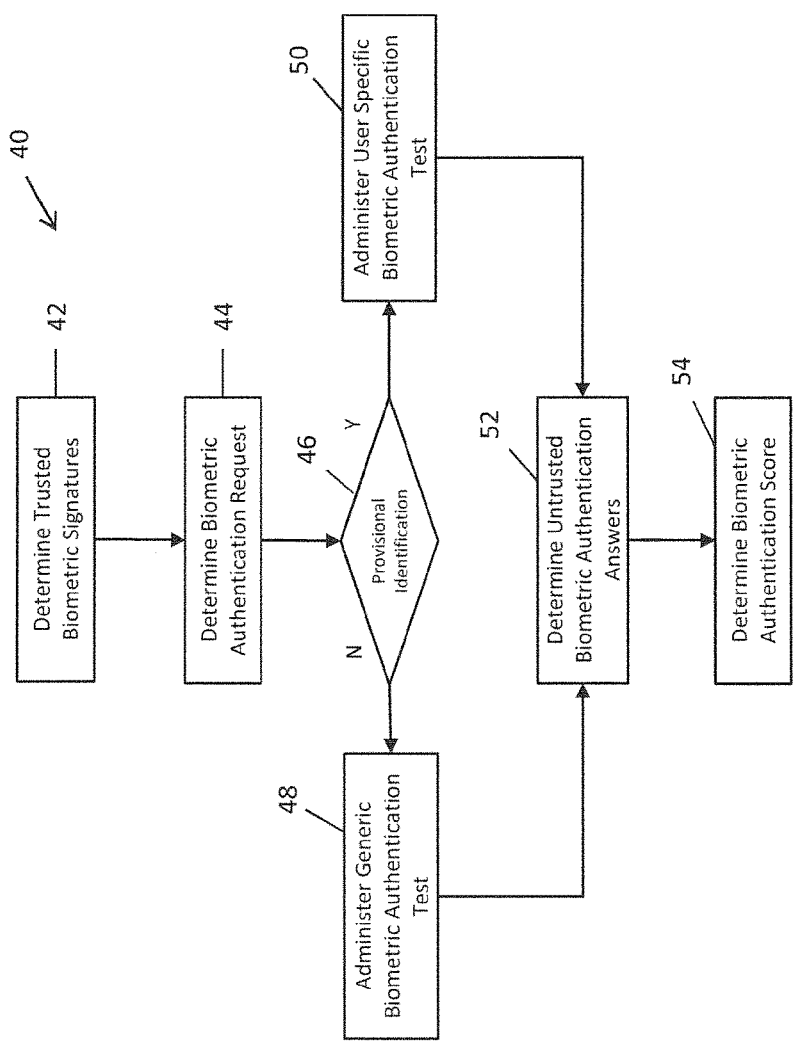
FIG. 2 illustrates a flowchart of a method of facilitating biometric authentication as contemplated by one non-limiting aspect of the present invention.

FIG. 2 illustrates a flowchart 40 of a method of facilitating biometric authentication as contemplated by one non-limiting aspect of the present invention. The method is predominately described with respect to the service provider 12, and the noted devices 24, 30, 34, 36 within the domain of the service provider 12, facilitating authentication for exemplary purposes only. The present invention is not necessarily limited to performing the authentication according to biometric information collected from a service provider 12 tasked with providing services to a number of subscribers. The exemplary illustration is provided to demonstrate one environment where an entity (e.g., the service provider 12) provides an infrastructure where trusted endpoints (gateway, user devices, etc.) are repeatedly used by known or approved users.

The reliance on a service provider type of structure is believed to particularly beneficial in that it is an environment where a number of interactions with user devices 14, 16, 18 can be monitored over time and reported through a trusted access point/gateway 26. A high speed data connection of a service provider 12, such as through a cable modem 26 and wireless router configuration, may be particularly beneficial in that the wireless connection capabilities provide a means to easily transmit monitoring applications to virtually any user device 14, 16, 18 connected to corresponding wireless network and to receive responses therefrom in a similar manner. The service provider 12 is also in a unique position to provision and monitor any changes in the provisioning of the access points 26 and user devices 14, 16, 18, which may be beneficial in preventing cloning and other authorized collections of user information, and to maintain a user's privacy by securely transmitting the biometric information through proprietary, in-band signaling means, e.g., messaging carried out through a STB. This type of structure, however, may be similarly implemented in other environments where biometric information can be collected from trusted entities.

Block 42 relates to determining trusted biometric signatures for a plurality of users. The biometric signatures may be considered to be trust if they are collected through a trusted access points, such as in the manner described above through user interactions with user device 14, 16, 18, and/or otherwise deemed trusted, such as being provided at the time of enrollment or through an authorized registration process. The trusted biometric signatures may be arranged into the library 36 of signatures and referenced using billing information, provisioning information, MAC/IP addressing or other methodologies to a gateway 26, device 14, 16, 18, subscriber, and individual users. Optionally, when a sufficient number of biometric signatures are associated with a particular gateway 26 or users, those signatures may be further analyzed to find the most unique signatures, word patterns, images, habits, etc. This ability may be used to define one or more unique/differentiated characteristics or signatures for the users, which may beneficial in developing the user specific biometric authentication test described below in more detail.

Block 44 relates to determining a biometric authentication request. The biometric authentication request may relate to a request to authenticate a particular user when the user is at an untrusted location or at any other location where authentication may be desired, e.g., authentication may be desired when the user is connected to the trusted gateway 26, such as when attempting to make a purchase through a website while connected to a home wireless network, when attempting to log into a secure portal, or when purchase a parentally controller movie/service. For exemplary and non-limiting purposes, the biometric authentication request is assumed to be from a point of sale device where a purchaser is attempting to purchase a product and a proprietor associated with the point of sale system desire an authentication of the purchaser. The authentication may be useful in allowing the purchaser to purchase the product without having to submit a credit card, badge or other relatively easily cloned device to complete the transaction (although such a device may be used as part of the authentication process).

With respect to making a purchase at a point of sale system, the biometric authentication request may include an identifier with respect to the level of authentication desired, such as low, medium, or high. Likewise, the biometric authentication request may include an identifier of the purchasing location, product being purchased, price of the product being purchased, and other parameters that may be useful in authenticating the purchaser or determining a level of testing needed to meet the desired level of authentication (optionally, more testing may be required to achieve higher level of authentication). Other parameters may be specified for other authentication scenarios associated with non-product dependent information, such as a time of day, security clearance, etc.

Block 46 relates to determining whether the biometric authentication request includes a provisional identification. The provisional identification may correspond with a credit card swipe, verbal or non-verbal name recitation, retinal scan, picture, and other indicator that may be suitable for use in limiting the number of the trusted biometric signature analyzed as part of the authentication process. The provisional identification may also be helpful in providing a two factor authentication scheme where biometric information provided in the provisional identification is of a different type than the biometric information matched with the purchaser, e.g., a fingerprint/credit card can be used to provisionally identify the purchaser and then a voice sample can be subsequently used to authenticate the provisional identification.

Blocks 48, 50 related to administering one of a generic and user specific biometric authentication test to the purchaser depending on whether the provisional identification was provided. The biometric identification test corresponds with a testing procedure where the point of sale device requests the purchaser to input certain biometric information to be used in selecting the one of the stored biometric signatures used to identify the purchaser as one of the users for which a trusted biometric signature is known. In the case of a verbal authentication, the biometric authentication test may require the purchaser to recite a certain set of words. The selected words may be generically determined if no provisional identification is provided or the selected words may be tailored to the most unique set of signatures of the provisionally identified purchaser. Optionally, some randomness may be added to prevent repeated use of the same test words in order to avoid a potential cloning situational, such as if a would be thief happens to record the purchaser's answers to the test question for use in generating subsequent answers.

Block 52 relates to determining untrusted, biometric authentication answers of the purchaser to the test administered in Blocks 48, 50. The answers may be embodied in a file or other recording conducted at the point of sale device in the event the test was a verbal type of test and/or in some other suitable form in the event the administered test included a non-verbal component. For example, the test may include both verbal and non-verbal questions in order to further refine the types of biometric information being analyzed as part of the authentication. The point of sale device may be configured to tabulate the biometric authentication answers into a transmitted file and/or a real-time or streaming scenario may be provided to stream the answers in the event the point of sale device has limited capabilities with respect to communicating response to the service provider 12.

Block 54 relates to determining a biometric authentication score for the purchaser. The biometric authentication score may reflect how closely the untrusted biometric information collected in Block 52 correlates with the trusted biometric information collected in Block 42. The biometric authentication score may then be interpreted by the point of sale device as an indication of whether to authenticate the purchaser. Optionally, the score may be provided on a relative scale, i.e., low, medium, or high or according to binary scale, such as pass/fail. The biometric authentication score may also include additional information, such as an account balance, an authorized spending limit (which may be tied to the level of authentication), and other parameters, such as the name of the user identified to be most closely correlated with the purchaser, their billing information (address, credit history, account balance (ATM, pre-paid account, etc.), and their clearance level (which may be more relevant to indicating approved levels of access to secure areas, databases, and network controls).

As supported above, a database 36 of unique user identity characteristics may be collected through a trusted device. The database 36 may be used to authenticate a user and send user confidential information to a third party (e.g., the authentication score, billing information, provisioning information, etc.). The collection of information may be unique to an individual, such as biometric information (e.g. voice or fingerprint) through a trusted device and an external database 36 composed of identity characteristics unique to the individual can be created. This external database 36 can then be used to authenticate the individual. For example, cable modems 26 and media information adapters can be authenticated, trusted devices at known physical addresses—a home, business, etc. An individual communicating through either of these devices is known to be at that address and may be biometrically enrolled, such as using a voice signature, by asking information known to both the individual and the enrolling party, such as account number and address. Additional voice samples of the individual may then be collected through these home devices 14, 16, 18 to raise the assurance level of the biometric sample. Once the individual's biometric information, such as voice, is collected within an external database 36, then the individual may be authenticated outside of the home through the use of this biometric information. Such authentication could include an assurance rating along with the authentication. The invention solves the problem of individuals needing to authenticate themselves to authorize actions such as payment via credit cards. Credit cards may be lost or stolen. This authentication system is better as an individual's unique characteristics would be significantly harder to steal than a credit card number.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A secure payment system operable to authenticate a purchaser attempting to make a purchase through a point of sale system, the system comprising:
   a service provider operable to provide media services to one or more media output devices, the media devices being authenticated by the service provider as being trusted;
   a biometric signature device operable with the service provider to generate biometric signatures for users from media output device originating biometric information, the media output device originating biometric information biometrically characterizing purchaser interaction with one or more of the media devices;
   a biometric authentication device operable to receive point of sale originating biometric information from the point of sale system, the point of sale system being untrusted at least in that the point of sale system has not been authenticated as trusted by the service provider, the point of sale originating biometric information biometrically characterizing purchaser interaction with the point of sale system; and
   wherein the biometric authentication device is operable to authenticate the purchaser as the user having the biometric signature most closely correlated with the point of sale originating biometric information.

2. The system of claim 1 wherein the media output device originating biometric information corresponds with voice commands issued by the users to control one or more media output devices.

3. The system of claim 2 wherein the point of sale originating biometric information corresponds with verbal answers of the purchaser spoken at the point of sale system in response to one or more test questions.

4. The system of claim 3 wherein the biometric authentication device selects the one or more test questions and instructs the point of sale device to administer the one or more test questions to the purchaser, and wherein the point of sale system provisionally identifies the purchaser to the biometric authentication device whereupon the biometric identification device selects the test questions from a plurality of test questions determined according to the provisional identification of the purchaser.

5. The system of claim 1 wherein the service provider provisions the media output devices at least to access the media services, the service provider determining the media devices to be trusted if the media devices are successfully provisioned to access the media services, wherein the point of sale system is provisioned at least to facilitate purchase of the product independently of the service provider, thereby causing the point of sale system to be less trusted than the media output devices from a perspective of the service provider.

6. A secure payment system operable to authenticate a purchaser attempting to make a purchase through a point of sale system, the system comprising:
   a service provider operable to provide media services to one or more media output devices, the service provider assigning unique addresses to each media output device to facilitate providing the media services;
   a biometric signature device operable with the service provider to generate biometric signatures for users from media output device originating biometric information transmitted from the one or more media output devices, the media output device originating biometric information biometrically characterizing user interaction with one or more of the media devices, each biometric signature being related to the address of the media output device transmitting the corresponding media output device originating biometric information;

a biometric authentication device operable to receive point of sale originating biometric information transmitted from the point of sale system, the point of sale originating biometric information biometrically characterizing purchaser interaction with the point of sale system; and wherein the biometric authentication device is operable to identify the purchaser as the user having the biometric signature most closely correlated with the point of sale originating biometric information, the biometric authentication device authenticating the identified user to make the purchase if the address related to the biometric signature of the identified user is within an address domain of the service provider and denying authentication of the identified user to make the purchase of the address related to the biometric signature of the identified user is beyond the address domain.

7. The system of claim 6 further comprising the biometric authentication device associating at least one user with each of the media output devices such that each address assigned by the service provider relates to at least one user, and the biometric authentication device overriding authentication of the identified user to make the purchase if the address related to the biometric signature of the identified user fails to match with the address assigned by the service provider for the same user.

8. A non-transitory computer-readable medium having a plurality of non-transitory instructions executable with a processor for authenticating a purchaser attempting to make a purchase through a point of sale system, the non-transitory instructions for:

determining one or more media output devices being provided media services;

generating biometric signatures for users from media output device originating biometric information, the media output device originating biometric information biometrically characterizing purchaser interaction with one or more of the media devices;

receiving point of sale originating biometric information from the point of sale system, the point of sale originating biometric information biometrically characterizing purchaser interaction with the point of sale system; and authenticating the purchaser as the user having the biometric signature most closely correlated with the point of sale originating biometric information.

9. The non-transitory computer-readable medium of claim 8 further comprising the non-transitory instructions for generating the media output device originating biometric information as a function of voice commands issued by the users to control one or more media output devices.

10. The non-transitory computer-readable medium of claim 9 further comprising the non-transitory instructions for receiving the point of sale originating biometric information as verbal answers of the purchaser spoken at the point of sale system in response to one or more test questions.

11. The non-transitory instructions of claim 10 further comprising the non-transitory instructions for:

receiving a provisional identification of the purchaser from the point of sale system;

instructing the point of sale device to administer the one or more test questions to the purchaser, including selecting the one or more test questions from a plurality of test questions determined according to the provisional identification of the purchaser.

12. The non-transitory computer-readable medium of claim 8 further comprising the non-transitory instructions for generating the media output device originating biometric information as a function of voice samples collected from the users.

13. The non-transitory computer-readable medium of claim 12 further comprising the non-transitory instructions for receiving the point of sale originating biometric information by instructing the point of sale system to prompt the purchaser to speak a plurality of words selected from the voice samples.

14. The non-transitory computer-readable medium of claim 8 further comprising the non-transitory instructions for receiving the point of sale originating biometric information as a fingerprint of the purchaser.

15. The non-transitory computer-readable medium of claim 8 further comprising the non-transitory instructions for further receiving the point of sale originating biometric information as an image of the purchaser.

16. The non-transitory computer-readable medium of claim 8 further comprising the non-transitory instructions for generating an authentication score for the user, the authentication score representing on a relative scale how closely the most closely correlated of the point of sale originating biometric information matches with the biometric signature of the purchaser.

17. The non-transitory computer-readable medium of claim 16 further comprising the non-transitory instructions for associating a purchase limit amount with the purchaser, the purchaser limit amount recommending a pecuniary limit for the purchaser based on the authentication test score such that the pecuniary limit is greater for higher authentication test scores than for lower authentication test scores.

* * * * *